Nov. 20, 1956  E. MORF  2,771,159
MOTOR-SPRING WINDING MECHANISM
Filed Feb. 9, 1955  2 Sheets-Sheet 1
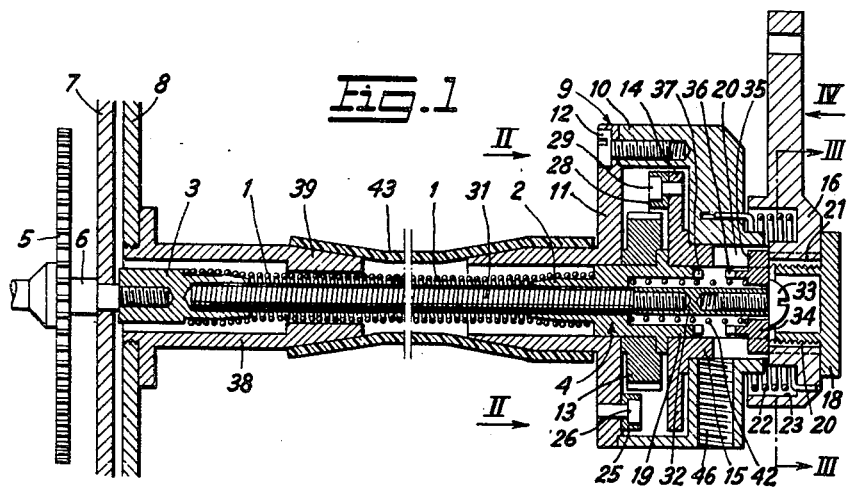
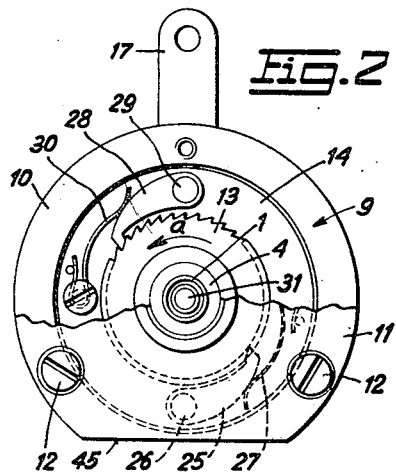
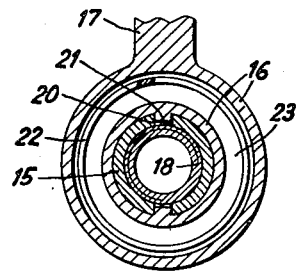
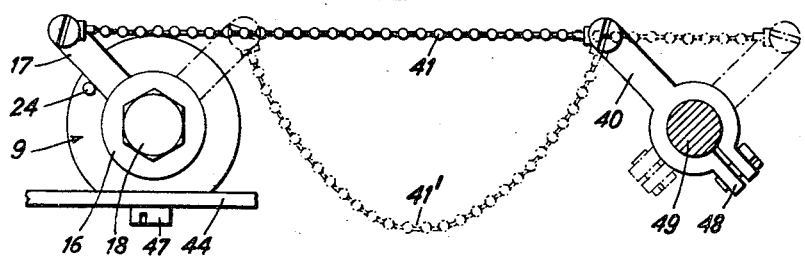
Inventor:
Ernest Morf
by: Michael S. Striker
agt Nov. 20, 1956 E. MORF 2,771,159
MOTOR-SPRING WINDING MECHANISM
Filed Feb. 9, 1955 2 Sheets-Sheet 2
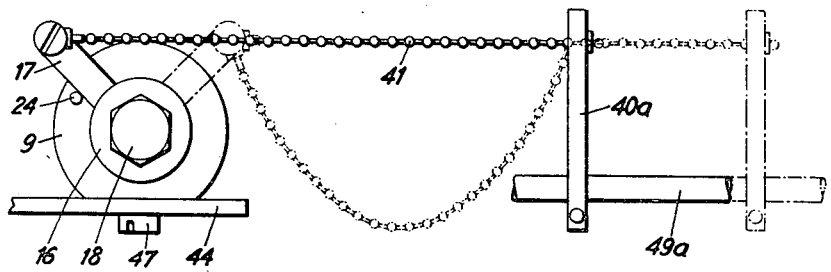
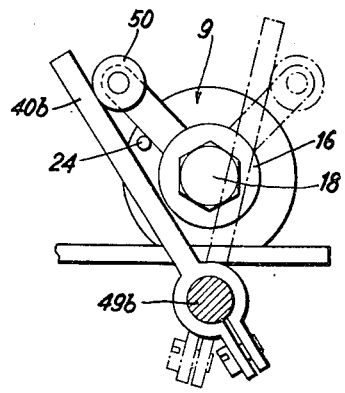
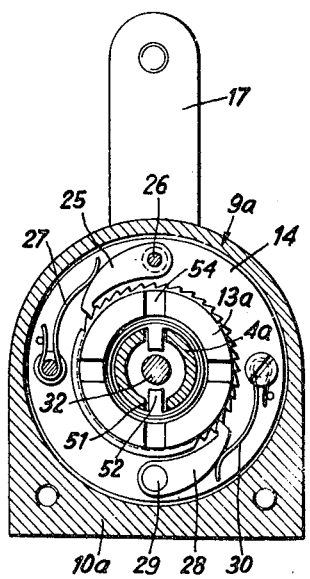
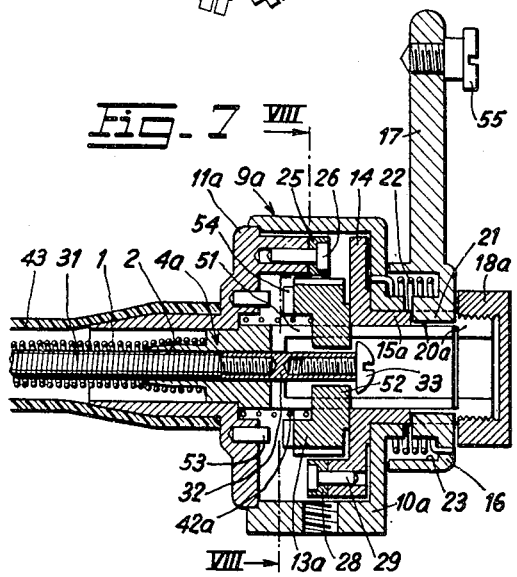

United States Patent Office 2,771,159
Patented Nov. 20, 1956

2,771,159
MOTOR-SPRING WINDING MECHANISM

Ernest Morf, La Chaux-de-Fonds, Switzerland

Application February 9, 1955, Serial No. 487,134

Claims priority, application Switzerland January 5, 1955

8 Claims. (Cl. 185—39)

This invention relates to motor-spring winding mechanisms in which said motor-spring or mainspring is bent between a rotatable winding element and a rotatable driven element so that this spring exerts a torque on said driven element upon a rotation of said winding element.

If the winding element is actuated automatically, over-winding of the motor—or mainspring must be prevented by appropriate means. Such means commonly comprise a clutch device in which two elements normally engage each other by friction, this friction being so adjusted that one of said elements starts moving with respect to the other, as soon as the motor—or mainspring tension has reached a predetermined value.

Besides the great wear to which the two said elements of these clutch devices are exposed, the latter still have the drawback that the friction in question cannot possibly be adjusted so exactly with respect to the mainspring tension, that a relative movement of said clutch elements always occurs when said mainspring tension reaches a quite determined value. Moreover, once one element of the clutch moves with respect to the other, it often stops again only when the spring tension has decreased a substantial amount below the value at which it started moving.

It is therefore an object of the invention to provide a winding mechanism in which overwinding of the motor- or mainspring is prevented by means controlled by said mainspring, said means including, however, no such clutch device.

Other objects of the invention will appear hereinafter in the course of the following description.

By way of example two embodiments and two variants of the winding mechanism according to the invention are represented diagrammatically in the drawings annexed to this specification and forming a part thereof.

In the drawings:

Fig. 1 is an axial section of a part of the winding mechanism according to the first embodiment, Fig. 2 is a view in the direction of arrows II of a part of Fig. 1 with some elements broken away, Fig. 3 is a section of Fig. 1 along line III—III, Fig. 4 is a view at a smaller scale of the mechanism of Fig. 1 in the direction of the arrow IV, Figs. 5 and 6 are views analogous to that of Fig. 4 showing each a variant of the first embodiment, Fig. 7 is a partial section analogous to that of Fig. 1 of the second embodiment, and Fig. 8 is a section along line VIII—VIII of Fig. 7.

By referring to the drawings, in which like numerals designate the same parts throughout, and in particular to Fig. 1, a coil-spring 1 is so mounted that one of its ends encompasses a sleeve 2 of a winding element 4 and the other end of this spring encompasses a sleeve 3 integral with an element 5 which is driven by the spring 1. The element 4 is driven itself in a manner described hereinafter in order to give the spring 1 a twist for winding it up. The element 5 constitutes the first element of a mechanism of which spring 1 constitutes the mainspring.

During the winding operation the element 4 rotates in the direction which corresponds to that in which the coils of the spring 1 are wound up.

The shaft 6 of element 5 pivots within a frame of which only a part of a base-plate 7 is represented in the drawings and this frame is located itself within a casing 8. The element 4 also pivots within a separate casing 9. This capsule-shaped, approximately circular casing 9 consists of a box 10 closed by a cover 11, which is fixed on said box by screws 12 (Fig. 2). The cover 11 and the bottom of the box 10 are provided each with a central opening. These openings serve each as bearing for the rotatable elements constituting the winding mechanism.

Besides element 4, this winding mechanism still comprises a ratchet-wheel 13 pressed with force fit on to element 4 and a rotatable member composed of a disc 14 made integral with a sleeve 15 and a head piece 16 made integral with an arm 17. This head piece is fixed to the disc (14, 15) by a cap-screw 18. The rotatable element (14, 15, 16, 17, 18) is journalled within the central opening of the bottom of the box 10 of casing 9, whereas the element 4 with the wheel 13 is journalled, on the one hand, within the central opening of the cover 11, and, on the other hand, within sleeve 15 by means of a second sleeve 19 integral with the element 4. The head piece 16 is secured to the disc 14, 15 by means of two diametrically opposite longitudinal slots 20 provided in the sleeve 15 in which internal corresponding ribs 21, integral with the head piece 15 (Fig. 3), are plunging.

A return-spring 22, located within an annular groove 23 of the head piece 16, has one end fixed to the bottom of the box 10 and the other end secured to the head piece 16, so that it always urges the rotatable element 14—18 counterclockwise in Fig. 4 into a well determined angular position, in which the arm 17 bears against a stop pin 24 set into the bottom of the casing 9.

The rotatable element 4 can only rotate in the direction of arrow $a$ in Fig. 2, because of a detent 25 pivoting around a stud 26 set in the cover 11 of casing 9, this detent being under the action of a spring 27 which maintains it in contact with the teeth of the ratchet wheel 13. Moreover, when the rotatable member 14—18 is rotating in the direction of arrow $a$, it drives the element 4 by means of a pawl 28 pivoting around a stud 29 set in the disc 14, this pawl being maintained in meshing relation with the ratchet wheel 13 by a spring 30. If the rotatable member 14—18 rotates in the other direction, the pawl 28 merely jumps over the teeth of the ratchet wheel 13 which is kept immovable by the detent 25.

It will be observed that each displacement of arm 17, counterclockwise in Fig. 2 (clockwise in Fig. 4), thus contributes directly to the winding of spring 1. Overlapping and entangling of the coils of this spring are avoided by a core constituted by a flexible wire 31 disposed within the coils of spring 1. The wire 31 is fixed at one end to the sleeve 3 which is screwed onto shaft 6, whereas the other end of the wire 31 freely passes through sleeve 2 of element 4. This free end of the wire 31 carries a socket 32 in which a head screw 33 is engaged. The latter can move axially towards the left in Fig. 1 and drive thus a latch 34 which is under the action of a release spring 42 located at least partially within the element 4 and urging latch 34 towards the right in Fig. 1. This latch 34 is angularly fixed to the rotatable member 14—18 by means of two radial ears 35 plunging into the slots 20 of sleeve 15. It is moreover provided with latching elements constituted by four notches 36 staggered at 90° one with respect to the other and arranged for cooperation with complementary elements constituted by two axial, diametrically opposite ears 37 of the sleeve 19. The slots 20 are long enough so that the latch 34 can move towards the left in Fig. 1 through a distance which is sufficient to enable the notches 36 seizing the ears 37.

When the latch 34 is thus moved towards the left and when the ears 37 are engaged within the notches 36, the rotatable member 14—18 and the movable element 4 are angularly fixed together.

At its end secured to the rotatable element 5, the spring 1 passes through a tubular projection 38 of casing 8, which is provided with a portion 39 the diameter of which is comprised between the external diameter of the coils of spring 1 when the latter is completely unwound, and the diameter of these coils when the spring 1 is completely wound up.

The rotatable member 14—18 is actuated by a control element 40 (Fig. 4) which moves between the two outmost positions represented in the drawings in full and in dot-and-dash lines, respectively. This control element 40 is connected to the arm 17 by a small chain 41.

The winding mechanism described functions as follows:

It will be observed at first that the convolutions or turns of spring 1 are not in contact with each other, when the spring is completely unwound. Furthermore, when this spring is set on the sleeves 2 and 3, the diameters of which are somewhat larger than the inner diameter of the convolutions of the spring 1, the latter must be forced through the portion 39 of piece 38. Once the spring 1 is set on the two sleeves 2, 3, its winding operation can start by actuating the arm 17. During this winding operation, the number of the turns of the spring increases; the convolutions are brought closer together and their diameter decreases. As long as this diameter has not become at least as small as that of portion 39 of the piece 38, the spring 1 actually exerts no driving torque on the rotatable element 5; but as soon as the spring 1 is wound up to such an extent that the diameter of its convolutions becomes smaller than that of the portion 39, the spring 1 transmits to the element 5 the whole force already stored up during this preliminary winding operation.

If the control element 40 further winds up the spring 1, the number of the turns of this spring increases until the convolutions come in contact with one another. The sizes of the spring 1 and of the wire 31 are so chosen that the diameter of the convolutions, when they come in contact with one another, is still larger than that of the wire 31, in order to prevent encompassing the wire 31 by the spring 1.

The control element 40 is, however, not kept from winding the spring 1 still more by the fact that the convolutions of this spring are contacting each other. Since the distance between the two sleeves 2 and 3 is fixed, the spring 1, however, causes the portion of the wire 31 normally comprised between the two sleeves 2 and 3, to become more and more longer by pulling this wire out of the movable element 4. The wire 31 forms thus a curve more and more sinuous between the two sleeves 2 and 3, within the protecting sheath 43, the diameter of which is materially larger than that of the spring 1. The free end of the wire 31 thus moves slowly towards the left in Fig. 1, while driving the latch 34 against the action of its release spring 42, until the left face of this latch, in which the notches 36 are provided, bears against the axial ears 37 of sleeve 19. From that moment, the member 14—18 need only drive the element 4 through an angle of at most 90°, until the ears 37 plunge into one pair of notches 36 of the latch 34 thus fixing the member 14—18 angularly to the element 4.

The member 14—18, which till then came always back against the stop pin 24 under the action of the return spring 22, while stretching out the small chain 41, upon a counterclockwise movement of the control element 40 in Fig. 4, will now no longer be able to move counterclockwise in Fig. 4 under the action of its return spring 22, because of the detent 25 which acts on the ratchet-wheel 13 to which the member 14—18 is now fixed by the latch 34.

Supposing that the ears 37 enter two notches 36 of the latch 34, when the arm 17 and the control element 40 are in a position situated between the two outmost positions represented in Fig. 4 in full and in dot-and-dash lines, respectively, it will be observed that this arm 17, together with all the other parts of the winding mechanism contained in casing 9 will remain immovable as long as the control element 40 is only moving between its outmost left position in Fig. 4 and the said intermediate position, the small chain 41 being thus not always stretched out between this control element 40 and the arm 17.

On the other hand, if element 40 is moving beyond this intermediate position, towards the right in Fig. 4, the small chain 41 will again be stretched out and the control element 40 will still drive the arm 17, until it reaches its outmost right position, which is represented in dot-and-dash lines in Fig. 4, the small chain 41 thus remaining stretched out between the element 40 and the arm 17.

If the element 40 comes then back to its outmost left position in Fig. 4, the arm 17 remains in the position represented in dot-and-dash lines and the chain comes in the position represented at 41'.

It will be observed that the control element 40 is not at all impeded in its movements, although its action on the mainspring 1 is completely stopped.

The rotation of the element 5 and of the mechanism not shown, which is driven by this element, slackens, however, the spring 1 by causing its number of turns to decrease. The spring 1 becomes then shorter and it allows the wire 31 to enter again the sleeve 2. By moving towards the right in Fig. 1, the head screw 33 releases the latch 34, which will also move towards the right under the action of its release spring 42. As soon as unwinding the spring 1 enables the wire 31 to move towards the right through such a distance that the notches 36 of the latch 34 also release the ears 37 of the sleeve 19, the member 14—18 becomes free from the element 4 and the ratchet-wheel 13. Its arm 17, which remained all the time in the position represented in dot-and-dash lines in Fig. 4, can again move counterclockwise in Fig. 4, under the action of the return spring 22, until this arm 17 stretches out again the small chain 41. From this moment, the displacements of the control element 40 will again be used for winding up the spring 1.

Supposing, however, that the element 40 remains immovable during a certain lapse of time, while the spring 1 further dissipates its accumulated energy through the element 5, to the mechanism driven by the latter, it will be observed that the number of turns of the spring 1 decreases more and more and that the convolutions of this spring are less and less close together; their diameter also increases. This number of turns will decrease, until the external diameter of the convolutions reaches the size of the opening of portion 39 of the tubular projection 38. As soon as the spring 1 comes in contact with the walls of the opening of this portion 39, it cannot be unwound anymore by the rotation of element 5 and the dissipation of its energy is thus suspended. It will be observed, however, that at that moment the spring 1 has still a certain amount of energy in reserve, which will be kept intact, until the control element 40 starts moving again.

The spring 1, having a linear characteristic, only drives the movable element 5 as long as its tension is comprised between two well determined limits. The lower limit of this tension is determined by the outer diameter of the convolutions of spring 1 and the upper limit is determined by the length of the spring itself, or, more exactly, by the number of its turns, since the convolutions of the spring are in contact with each other, when the spring reaches its upper limit of tension.

The mechanism described is used preferably for a car-watch with self-winding mechanism. In this case the casing 8 contains the gear-wheels of the watch as well as its escapement mechanism and its indicating device. The element 5 comprises a wheel which preferably meshes with the pinion of the great wheel or center-wheel, not shown. The casing 8 is located at the desired place of the car, for instance on the instrument-board.

As to the casing 9, it can be fixed, for instance in the vicinity of the carburettor, to a plate 44 fixed to the frame of the car. A flat part 45 is provided for this purpose on the casing 9 (Fig. 2) as well as a tapped bore 46 (Fig. 1), in which a fixing screw 47 may be engaged. The control element is then fixed to the control rod 49 of the carburettor by means of a clamp 48.

In the case described it has been supposed that the rod 49 is rotating between two outmost positions corresponding, one, to the position of the accelerator pedal at rest, and the other, to the position of this pedal when it is pressed down entirely.

The distance between the two casings 8 and 9 is chosen so that the spring 1 has a sufficient length in order to fulfill the following three conditions:

1. When the spring 1 is wound to its upper limit, it has at least sixty turns more than when it is wound to the minimum determined by the portion 39 of the tubular projection 38, so that the watch will run at least a fortnight, when it is wound completely, the element 5 moving thereby six times slower than the great wheel and doing thus four revolutions a day;

2. Even when the spring 1 is completely wound up, it is solicited far below its limit of elasticity, so that it will neither get any permanent deformation, nor risk to break;

3. The minimum of the mainspring tension is not inferior to half the maximum tension, that is to say, the spring 1 has then already sixty coils more than when it is completely unwound; the minimum tension represents thus at least 50% of the maximum tension. Preferably this minimum is even chosen so that it represents 60% of the maximum tension.

Under these conditions, even if the car stands more than a fortnight, and if the watch is at rest, the watch will start running again, as soon as the gas pedal has been actuated three or four times, just enough in order to remove the spring 1 from the wall of the portion 39 of the tubular projection 38. This spring 1 will then immediately transmit at least 50% of its maximum force to the element 5 and the watch will run conveniently.

In the most frequent cases, where the car is used every week-end, the spring 1, which is completely wound up Sunday evening, will still have a tension superior to 80% of its maximum tension the next Saturday morning.

The variant represented in Fig. 5 is concerned with the mounting of the mechanism described in the case, where a control element 40a is fixed to a piece 49a which does not rotate as the rod 49, but which moves parallel to itself to and fro between two outmost positions represented in full and dot-and-dash lines, respectively. This rod 49a could also be the control rod of a carburettor of a motor car.

The mechanism of this variant functions like that, which has been described before and which is represented in Figs. 1 to 4.

In the second variant represented in Fig. 6, the casing 9 is located just above a rod 49b, which moves like the rod 49 in Fig. 4.

The element 40b which is secured to the rod 49b comes directly in contact with a roller 50 mounted at the end of arm 17. The function of this device is just the same as that of the device described in Fig. 4.

It will further be observed that the mechanism represented in Figs. 1 and 2 does not need to be actuated by an element such as 40, 40a or 40b, fixed to a rod 49, 49a, 49b, which only moves between two outmost positions.

This mechanism could just as well be actuated by a rod or a shaft which rotates continuously or moves in any manner. A cam could, of course, be fixed to this shaft and a roller at the end of the arm 17, so that the roller follows the cam (against which it is urged by means of the return spring 22), as long as the latch 34 does not prevent it from coming in contact with the cam, once the roller has passed the outmost point of the cam.

Eventually, if the mechanism described is the winding mechanism of a car-watch, it will be understood that the winding operation could also be ensured by any other element, than the control rod of the carburettor. This element need only have enough energy, so that its movements will not be disturbed by the resistance of the arm 17, especially when the spring 1 is almost completely wound up. The displacements of this control element should, however, not be too quick because of the inertia of the member 14—18.

The winding mechanism according to the second embodiment (Figs. 7 and 8) differs from that of the first embodiment first by the fact that one end of the coil-spring 1 encompasses a sleeve 2 of a winding element 4a, which is constituted by a cylindrical hollow piece, provided with two longitudinal slots 51 extending almost over the whole length of this piece from the end thereof opposite to the sleeve 2. This element 4a is located within a casing 9a analogous to the casing 9 of the first embodiment and comprising a box 10a closed by a cover 11a, which is engaged with force fit into the box 10a. It is, however, obvious that the cover 11a could just as well be screwed to the box 10a as in the first embodiment. A ratchet-wheel 13a analogous to the ratchet-wheel 13 of the first embodiment, is arranged around the element 4a, to which it is fixed angularly by means of two internal ears 52, which plunges into the slots 51 of the movable element 4a. The length of these slots 51 is actually sufficient in order to enable this wheel 13a to slide axially towards the left along the movable element 4a from the position represented in Fig. 7, so far, that, first, its left face may come in contact with two pins 53 set in the cover 11a, and that secondly these pins may enter any pair of the four notches 54, cut in the left face of the wheel 13a. The notches 54 are staggered at 90° from each other. When the pins 53 are engaged in a pair of notches 54, the wheel 13a is immobilised together with the element 4a.

Like in the first embodiment, this wheel 13a is actuated here by a rotatable member comprising a disc 14 and a head piece 16. The disc 14 is made integral with a sleeve 15a provided with slots 20a; and the head piece 16 carries an arm 17 and is fixed angularly to the piece 14, 15a by means of two ribs 21, which plunge into the slots 20a. Still like in the first embodiment, this rotatable member (14, 15a, 16, 17) is subjected to the action of a return spring 22 which urges and keeps the arm 17 against a stop pin (not shown) set in the bottom of the box 10a. The head piece 16 is also axially held in place on the sleeve 15a by a nut 18a screwed onto a threaded portion of this sleeve.

The rotatable member 14—17 drives the wheel 13a, like in the first embodiment, by means of a pawl 28, in the direction which corresponds to that in which the spring 1 is coiled up, whereas the detent 25 prevents this wheel 13a from moving in the other direction.

Unlike in the first embodiment this wheel 13a is here set with force fit on the movable element 4a. This wheel plays here also the part of the latch 34 of the first embodiment. Like the latch 34, the wheel 13a is moved against the action of a release spring 42a by the head of the screw 33 which is engaged in the socket 32 fixed at the free end of the wire 31. Also like the latch 34 of the first embodiment, this wheel 13a is actuated here by the screw 33, when the spring 1 is already wound up to such an extent, that its convolutions are in contact with each other the rotatable member 14—17 winding up the spring furthermore.

The only difference between the latching ensured in this embodiment by the wheel 13a and the pins 53, and that which is ensured in the first embodiment by the latch 34, lies in the fact that once the pins 53 are engaged within two of the notches 54, the wheel 13a is completely immobilised angularly together with the element 4a. As regards the member (14—17), it is locked by the pawl 28 in the direction in which it winds the spring 1, whereas it still may rotate freely under the action of its return spring 22, until the latter has driven the arm 17 back against the stop pin not shown, which is set in the bottom of the box 10a.

Since this rotatable member is also driven here by a control element of the same type as those, which are represented in Figs. 4 and 5, it is obvious in this second embodiment that the control element and the arm 17 cannot be connected merely by a small chain, since the control element would then be locked at the same time as the arm 17. In this embodiment, the control element is resiliently connected to the arm 17 by means of a spring, so that this control element will never be impeded in its displacements. This spring is attached to a stud 55 fixed to the arm 17, and it is stronger than the spring 1, even when the latter is completely wound up. This connecting spring is thus provided for working only when the wheel 13a is locked in the manner described above.

While I have shown and described different embodiments of my invention, I wish it to be understood that I do not desire to be limited to the details thereof as various modifications may occur to a person skilled in the art.

What I claim is:

1. In an apparatus the combination of: a rotatable driven element having a sleeve coaxial to its axis of rotation; a rotatable winding element having a sleeve coaxial to its axis of rotation; a cylindrical coil-spring having its ends encompassing each one of said sleeves so as to exert a torque on said driven element upon a rotation of said winding element in the winding direction corresponding to that in which the turns of said coil-spring are coiled up; a flexible core fixed at one end to said driven element and extending within the turns of said coil-spring throughout the whole spring for preventing overlapping and entangling of said turns, the other end of said core passing freely through said winding element; means for preventing said winding element from rotating in the direction opposite to the winding direction; and a mechanism for driving said winding element in the winding direction, thereby increasing the number of turns of the coil-spring until first said turns come in contact with one another and then the coil-spring becomes longer thus displacing the free end of said core axially relative to said winding element, said winding mechanism comprising: a member mounted for rotation, spring means urging said member in one direction, power means for driving said member in the other direction, against the action of said spring means, transmitting means connecting said member to said winding element and so arranged that this member drives said element in the winding direction when said member is actuated by said power means, latching means controlled by said core for locking said member when the number of turns of said coil-spring increases beyond such a limit that said spring has already displaced said free end of the core through a predetermined distance axially relative to the winding element, and means for unlocking said member when the number of turns of said coil-spring decreases beneath said limit.

2. In an apparatus the combination of: a rotatable driven element having a sleeve coaxial to its axis of rotation; a rotatable winding element having a sleeve coaxial to its axis of rotation; a cylindrical coil-spring having its ends encompassing each one of said sleeves so as to exert a torque on said driven element upon a rotation of said winding element in the winding direction corresponding to that in which the turns of said coil-spring are coiled up; a flexible core fixed at one end to said driven element and extending within the turns of said coil-spring throughout the whole spring for preventing overlapping and entangling of said turns, the other end of said core passing freely through said winding element; means for preventing said winding element from rotating in the direction opposite to the winding direction; and a mechanism for driving said winding element in the winding direction, thereby increasing the number of turns of the coil-spring until first said turns come in contact with one another and then the coil-spring becomes longer thus displacing the free end of said core axially relative to said winding element, said winding mechanism comprising: a member mounted for rotation, spring means urging said member in one direction, power means arranged for driving said member in the other direction, against the action of said spring means, transmitting means connecting said member to said winding element and so arranged that this member drives said element in the winding direction when said member is actuated by said power means, a latch shiftable between an inoperative position and a latching position in which said latch removes said member from the action of said power means, and a releasing spring permanently urging said latch towards said inoperative position in which said member is under the action of said power means, the free end of said core engaging said latch for shifting it from said inoperative position into its latching position, against the action of said releasing spring, when said free end is displaced axially relative to said winding element by said coil-spring.

3. The combination of claim 2 in which said latch is adapted for solidarising angularly said member and said winding element, when the latch is in said latching position.

4. The combination of claim 2, in which said latch is angularly fixed to and shiftably mounted on said member, and is provided with at least one latching element, and in which said winding element is provided with at least one element arranged for cooperation with said latching element for fixing said member angularly to said winding element when the latch is in said latching position.

5. The combination of claim 4, in which said member carries an arm integral therewith, and said power means includes a control element movable between two outmost positions, a small chain connecting thereby said control element to said arm.

6. The combination of claim 4, in which said member carries an arm integral therewith and a roller mounted on said arm, and said power means includes a movable element, the spring means which act on said member thereby maintaining normally said roller in contact with said movable element.

7. In an apparatus the combination of: a rotatable driven element having a sleeve coaxial to its axis of rotation; a rotatable winding element having a sleeve coaxial to its axis of rotation; a cylindrical coil-spring having its ends encompassing each one of said sleeves so as to exert a torque on said driven element upon a rotation of said winding element in the winding direction corresponding to that in which the turns of said coil-spring are coiled up; a flexible core fixed at one end to said driven element and extending within the turns of said coil-spring throughout the whole spring for preventing overlapping and entangling of said turns, the other end of said core passing freely through said winding element; means for preventing said winding element from rotating in the direction opposite to the winding direction; and a mechanism for driving said winding element in the winding direction, thereby increasing the number of turns of the coil-spring until first said turns come in contact with one another and then the coil-spring becomes longer thus displacing the free end of said core axially relative to said winding element, said winding mechanism comprising: a member mounted for rotation, spring means urging said member in one direction, power means including a movable element connected to said member for driving it in the other direction, against the action of said spring means, transmitting means connecting said member to said winding element and so arranged that this member drives said element in the winding direction when said member is actuated by said movable element, a latch driven in rotation by said member at least when the latter rotates in the winding direction, said latch being shiftable between an inoperative position and a latching position in which it is immobilised and it prevents any displacements of said member in the winding direction, a releasing spring permanently urging said latch towards said inoperative position in which said member is under the action of the movable element of said power means, the free end of said core engaging said latch for shifting it from said inoperative position into its latching position, against the action of said releasing spring, when said free end is displaced axially relative to said winding element by said coil-spring, and resilient means interposed between said member and the movable element of said power means for allowing said movable element to move even if said member is locked by said latch.

8. In an apparatus the combination of: a rotatable driven element having a sleeve coaxial to its axis of rotation; a rotatable winding elmeent having a sleeve coaxial to its axis of rotation; a cylindrical coil-spring having its ends encompassing each one of said sleeves so as to exert a torque on said driven element upon a rotation of said winding element in the winding direction corresponding to that in which the turns of said coil-spring are coiled up; a flexible core fixed at one end to said driven element and extending within the turns of said coil-spring throughout the whole spring for preventing overlapping and entangling of said turns, the other end of said core passing freely through said winding element; means for preventing said winding element from rotating in the direction opposite to the winding direction; and a mechanism for driving said winding element in the winding direction, thereby increasing the number of turns of the coil-spring until first said turns come in contact with one another and then the coil-spring becomes longer thus displacing the free end of said core axially relative to said winding element, said winding mechanism comprising: a member mounted for rotation coaxially to said winding element, spring means urging said member in one direction, power means including a movable element connected to said member for driving it in the other direction, against the action of said spring means, a pawl carried by said member, a ratchet-wheel angularly fixed to said winding element, said pawl driving said ratchet-wheel when said member is driven by said movable element, and jumping over the teeth of said ratchet-wheel when said member is moving under the action of said spring means, at least one fixed latching element, at least one latching element on said ratchet-wheel, said ratchet-wheel being shiftable along said winding element, between an inoperative position and a latching position in which it is immobilized by its latching element engaging at this moment said fixed latching element, thus preventing any displacement of said member in the winding direction, a releasing spring permanently urging said ratchet-wheel towards said inoperative position in which said member is under the action of the movable element of said power means, the free end of said core engaging said ratchet-wheel for shifting it from said inoperative position into its latching position, against the action of said releasing spring, when said free end is displaced axially relative to said winding element, by said coil-spring, and resilient means interposed between said member and the movable element of said power means for allowing said movable element to move even if said member is locked by said ratchet-wheel.

References Cited in the file of this patent
UNITED STATES PATENTS

| | | |
|---|---|---|
| 1,127,134 | Wehinger | Feb. 2, 1915 |
| 1,220,692 | Schulte | Mar. 27, 1917 |
| 1,788,729 | Meier | Jan. 13, 1931 |